United States Patent
Rosario et al.

(10) Patent No.: US 8,554,463 B2
(45) Date of Patent: Oct. 8, 2013

(54) NAVIGATION SYSTEM FOR A MOTOR VEHICLE

(75) Inventors: Daniel Rosario, Santa Cruz, CA (US); Brian Ng, San Jose, CA (US); Thomas Chan, Mountain View, CA (US); Arne Stoschek, Palo Alto, CA (US)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/501,554

(22) Filed: Aug. 8, 2006

(65) Prior Publication Data

US 2007/0233363 A1    Oct. 4, 2007

Related U.S. Application Data

(63) Continuation-in-part of application No. 11/395,705, filed on Mar. 31, 2006, and a continuation-in-part of application No. 11/439,315, filed on May 22, 2006, and a continuation-in-part of application No. 11/472,622, filed on Jun. 21, 2006, which is a continuation-in-part of application No. 11/395,705, and a continuation-in-part of application No. 11/439,315.

(60) Provisional application No. 60/800,222, filed on May 11, 2006.

(51) Int. Cl.
*G01C 21/00* (2006.01)
*G01C 21/34* (2006.01)

(52) U.S. Cl.
USPC .......................................... 701/400; 701/408

(58) Field of Classification Search
USPC ............................. 701/200; 700/202; 342/57
See application file for complete search history.

(56) References Cited

U.S. PATENT DOCUMENTS

| 5,508,917 | A |   | 4/1996  | Siegle et al. |
|-----------|---|---|---------|---------------|
| 5,839,086 | A |   | 11/1998 | Hirano        |
| 6,148,261 | A |   | 11/2000 | Obradovich et al. |
| 6,157,155 | A | * | 12/2000 | Kobayashi ............... 318/568.22 |
| 6,285,317 | B1 |  | 9/2001  | Ong           |
| 6,324,467 | B1 |  | 11/2001 | Machii et al. |
| 6,336,073 | B1 |  | 1/2002  | Ihara et al.  |
| 6,647,270 | B1 | * | 11/2003 | Himmelstein ............. 455/456.1 |

(Continued)

FOREIGN PATENT DOCUMENTS

| DE | 40 39 887 | 6/1992 |
| DE | 698 15 940 | 6/2004 |

(Continued)

OTHER PUBLICATIONS

Periodical Autoconnect 2005, Vereinigte Motor—Verlage GmbH & Co. KG (United Motor publishing house, Inc.), Leuschnerstr. 1, 70174 Stuttgart, Federal Republic of Germany, pp. 18 and 21.

(Continued)

*Primary Examiner* — Ian Jen
(74) *Attorney, Agent, or Firm* — Kenyon & Kenyon LLP

(57) ABSTRACT

A navigation system is for a motor vehicle. The navigation system includes a motor vehicle, an isolated, immobile memory node for storing navigation data, a wireless communication connections between the isolated, immobile memory node and the motor vehicle for transmitting the navigation data from the isolated, immobile memory node to the motor vehicle and a man-machine interface arranged in the motor vehicle for outputting the navigation data to an operator of the motor vehicle.

20 Claims, 8 Drawing Sheets

(56) References Cited

U.S. PATENT DOCUMENTS

| | | | |
|---|---|---|---|
| 6,707,378 B2* | 3/2004 | MacNeille et al. | 340/435 |
| 6,745,111 B2 | 6/2004 | Maruyama et al. | |
| 6,765,495 B1* | 7/2004 | Dunning et al. | 340/903 |
| 6,826,472 B1 | 11/2004 | Kamei et al. | |
| 6,862,524 B1 | 3/2005 | Nagda et al. | |
| 6,868,331 B2 | 3/2005 | Hanebrink | |
| 6,898,516 B2* | 5/2005 | Pechatnikov et al. | 701/202 |
| 6,965,829 B2* | 11/2005 | Yamadaji et al. | 701/301 |
| 6,996,469 B2 | 2/2006 | Lau et al. | |
| 7,046,168 B2* | 5/2006 | Tsuboi | 340/903 |
| 7,103,368 B2 | 9/2006 | Teshima | |
| 7,110,882 B2* | 9/2006 | Moser et al. | 701/472 |
| 7,233,864 B2* | 6/2007 | Moser et al. | 701/472 |
| 7,269,503 B2 | 9/2007 | McGrath | |
| 7,272,357 B2* | 9/2007 | Nishiga et al. | 455/11.1 |
| 7,286,825 B2* | 10/2007 | Shishido et al. | 455/435.1 |
| 7,383,123 B2 | 6/2008 | Park | |
| 2001/0019309 A1 | 9/2001 | Saeki et al. | |
| 2001/0020211 A1 | 9/2001 | Takayama et al. | |
| 2002/0032035 A1 | 3/2002 | Teshima | |
| 2002/0177948 A1 | 11/2002 | Upparapalli et al. | |
| 2003/0028314 A1 | 2/2003 | Nagamune | |
| 2003/0102997 A1* | 6/2003 | Levin et al. | 342/57 |
| 2003/0234720 A1* | 12/2003 | MacNeille et al. | 340/435 |
| 2004/0015292 A1 | 1/2004 | Wiio et al. | |
| 2004/0082350 A1* | 4/2004 | Chen et al. | 455/518 |
| 2004/0204848 A1 | 10/2004 | Matsuo et al. | |
| 2004/0249565 A1 | 12/2004 | Park | |
| 2005/0197842 A1 | 9/2005 | Bergmann et al. | |
| 2005/0216147 A1 | 9/2005 | Ferman | |
| 2005/0222760 A1 | 10/2005 | Cabral et al. | |
| 2005/0248484 A1* | 11/2005 | Stoschek et al. | 342/357.07 |
| 2005/0270311 A1 | 12/2005 | Rasmussen et al. | |
| 2006/0074553 A1 | 4/2006 | Foo et al. | |
| 2006/0161341 A1 | 7/2006 | Haegebarth et al. | |
| 2006/0164412 A1* | 7/2006 | Dupont et al. | 345/419 |
| 2007/0093958 A1 | 4/2007 | Jonsson et al. | |
| 2007/0233369 A1 | 10/2007 | Ng et al. | |
| 2007/0233371 A1 | 10/2007 | Stoschek et al. | |
| 2007/0271035 A1 | 11/2007 | Stoschek et al. | |
| 2008/0065322 A1 | 3/2008 | Ng et al. | |

FOREIGN PATENT DOCUMENTS

| | | |
|---|---|---|
| DE | 10 2004 061 782 | 9/2005 |
| DE | 10 2005 013 648 | 9/2006 |
| EP | 0 243 635 | 1/1993 |
| EP | 0 694 895 | 1/1996 |
| EP | 0 875 730 | 11/1998 |
| EP | 1 033 692 | 9/2000 |
| EP | 1 035 531 | 9/2000 |
| EP | 1 168 286 | 1/2002 |
| EP | 1 376 059 | 1/2004 |
| EP | 0 990 119 | 11/2005 |
| EP | 1 757 904 | 2/2007 |
| FR | 2 634 707 | 2/1990 |
| JP | 06 036186 | 2/1994 |
| JP | 10 241094 | 9/1998 |
| JP | 2002-131065 | 5/2002 |
| JP | 2004-227162 | 8/2004 |
| WO | 98/59215 | 12/1998 |
| WO | WO 2005/124280 | 12/2005 |

OTHER PUBLICATIONS

Bleyer et al., "Car-to-Car Communication," p. 16-19, Apr. 2002. (Translated).

PCT International Search Report and Written Opinion, PCT International Application No. PCT/EP2007/001906, dated Jun. 14, 2007 (English-language translation provided).

PCT International Search Report and Written Opinion of the International Searching Authority, PCT International Patent Application No. PCT/EP2007/001904, dated Jun. 21, 2007, (English-language translation provided).

PCT International Search Report and Written Opinion of the International Searching Authority, PCT International Patent Application No. PCT/EP2007/001905, dated Sep. 12, 2007, (English-language translation provided).

PCT International Search Report, Written Opinion of the International Searching Authority and International Preliminary Report on Patentability, PCT International Patent Application No. PCT/EP2007/002423, dated Nov. 17, 2008, (English-language translation provided).

\* cited by examiner ered) central location via the already existing communication network. Data transmission may take place, for example, by radio at a radio frequency above a frequency of 3 THz.

NAVIGATION SYSTEM FOR A MOTOR VEHICLE

CROSS-REFERENCE TO RELATED APPLICATIONS

This application is: (1) a continuation-in-part of U.S. patent application Ser. No. 11/395,705, filed on Mar. 31, 2006, which is expressly incorporated herein in its entirety by reference thereto; (2) a continuation-in-part of U.S. patent application Ser. No. 11/439,315, filed on May 22, 2006, which is expressly incorporated herein in its entirety by reference thereto; and (3) a continuation-in-part of U.S. patent application Ser. No. 11/472,622, filed on Jun. 21, 2006, which is expressly incorporated herein in its entirety by reference thereto, and which (i) is a continuation-in-part of U.S. patent application Ser. No. 11/395,705, filed on Mar. 31, 2006; (ii) is a continuation-in-part of U.S. patent application Ser. No. 11/439,315, filed on May 22, 2006; and (iii) claims the benefit of U.S. Provisional Patent Application Ser. No. 60/800,222, filed on May 11, 2006.

This application claims the benefit of U.S. Provisional Patent Application Ser. No. 60/800,222, filed on May 11, 2006, which is expressly incorporated herein in its entirety by reference thereto.

FIELD OF THE INVENTION

The present invention relates to a navigation system for a motor vehicle.

BACKGROUND INFORMATION

European Published Patent Application No. 0 875 730 and German Published Patent Application No. 698 15 940 describe a map data display device for use in a vehicle navigation device having a data-conversion device for recording points of map data according to a map, from a viewpoint line through a viewing line originating from the viewpoint and having an angle of depression with respect to the plane of the map; and for perspectively projecting the points of the map data onto a viewing plane, which is fixed perpendicularly to the viewing line and is a predefined distance from the viewpoint in order to generate map display data. This produces a bird's-eye view of an environment. A navigation system having a bird's-eye view of an environment is also described in French Published Patent Application No. 2 634 707 and the periodical Autoconnect 2005, Vereinigte Motor-Verlage GmbH & Co. KG (United Motor Publishing House, Inc.), Leuschnerstr. 1, 70174 Stuttgart, Federal Republic of Germany, pages 18 and 21.

European Published Patent Application No. 0 990 119 describes a digital personal communication device having a processor, a memory that the processor can access, and a display that is connected to the processor; the display displaying map data and a position of the digital personal communication device with respect to the map data, and the map data including route points, i.e., coordinates, as instructed by the processor. Furthermore, the digital personal communication device includes an input device for forming queries for map data and for selecting route points, and a GPS receiver which is connected to the processor; the processor being programmed to process data it receives from the GPS receiver, such that the position of the digital personal communication device is able to be determined from the data. In addition, the digital personal communication device includes a transmitter that is connected to the processor; the processor being programmed such that, using the transmitter, it requests map data from a map memory and a transmission device, that it processes further the map information it has received from the map memory and the transmission device, and that it determines the availability of additional stored data for route points in the memory during the selection of one of the route points by the input device, and that it requests, using the transmitter, additional stored data from the map memory and the transmission device during the selection of one of the route points if additional stored data are not available in the memory.

SUMMARY

Example embodiments of the present invention provide a navigation device for a motor vehicle.

According to an example embodiment of the present invention, a navigation system is for a motor vehicle, the navigation system including a motor vehicle, an isolated, immobile memory node for storing navigation data, a wireless communication connection between the isolated, immobile memory node and the motor vehicle for transmitting the navigation data from the isolated, immobile memory node to the motor vehicle and a man-machine interface arranged in the motor vehicle for outputting the navigation data to an operator of the motor vehicle.

Navigation data includes, e.g., a map display and data concerning the navigation system for the augmented display in the map display. Navigation data includes, e.g., a route atlas, a graphic map display, as well as information concerning a navigation system for augmented display in the map display together with a position of the motor vehicle and/or a suggested route for the motor vehicle. Navigation data includes, e.g., data concerning a navigation system which by its nature is independent of a position of the motor vehicle and/or a suggested route for the motor vehicle. Navigation data includes, e.g., a point of interest (POI) and/or additional information assigned to a point of interest (POI). Transmitted navigation data may also include or be updating data for updating navigation data that are already stored.

An isolated memory node includes a memory that is not connected to the Internet and/or another network. An immobile memory node includes a memory that is firmly connected to the ground and/or is usually not moved. A memory that is usually not moved may be, for example, a memory assigned to a construction site which is substantially not moved for the duration of the construction site or a certain section of the construction. A temporary memory disposed for a construction site may, for example, be immobile. An example of an isolated, immobile memory node for storing navigation information may be, for example, a memory node at the entrance to a national park which transmits, as navigation data, data about camp sites and/or ranger stations in the national park to passing motor vehicles. Isolated, immobile memory nodes for storing navigation data may also be arranged, for example, on street lamps, on traffic signs, on signal lights and/or street markers. Appropriate isolated, immobile memory nodes may include, for example, detailed navigation data such as map displays and/or pictures at high resolution with reference to their (immediate) surroundings.

An update of isolated, immobile memory nodes, or the navigation data stored therein, is able to take place by hopping or passing on corresponding data from one isolated, immobile memory node to the next isolated, immobile memory node. An update of isolated, immobile memory nodes, or the navigation data stored therein, may alternatively or in addition take place by transmitting appropriate data from an (authorized) motor vehicle or computer to the corresponding isolated, immobile memory node. An update of isolated, immobile memory nodes, or the navigation data stored therein, may alternatively or in addition take place by transmitting appropriate data from a wireless Internet access to the corresponding isolated, immobile memory node. An update of isolated, immobile memory nodes takes place, e.g., at times at which they are hardly used, or not at all.

The motor vehicle may also include an onboard navigation system to determine the position of the motor vehicle and to determine a suggested route, the man-machine interface being assigned to the onboard navigation system. A man-machine interface may be assigned to an onboard navigation system if it is arranged to output data of the onboard navigation system to an operator.

The navigation system may also include an additional motor vehicle and a wireless communication connection between the isolated, immobile memory node and the additional motor vehicle for transmitting the navigation data or additional navigation data from the motor vehicle to the isolated, immobile memory node. A wireless communication connection between the isolated, immobile memory node and the motor vehicle and a wireless communication connection between the isolated, immobile memory node and the additional motor vehicle may exist offset in time.

The navigation system may also include an additional motor vehicle and a wireless communication connection between the motor vehicle and the additional motor vehicle for transmitting the navigation data from the motor vehicle to the additional motor vehicle.

The navigation system may also include a server that is spatially separated from the motor vehicle and a wireless communication connection between the server and the motor vehicle for transmitting the position of the motor vehicle, a desired destination for the motor vehicle, the navigation data and/or additional navigation data from the motor vehicle to the server. A wireless communication connection between the isolated, immobile memory node and the motor vehicle and a wireless communication connection between the server and the motor vehicle may exist offset in time.

Using the wireless communication connection between the server and the motor vehicle, a suggested route for the motor vehicle, the navigation data and/or additional navigation information may be transmitted from the server to the motor vehicle.

In an example embodiment of the present invention, a navigation system for a motor vehicle includes one or more of the above-named features, the navigation system including an isolated, immobile memory node for storing navigation data, and a wireless communication connection between the isolated, immobile memory node and the motor vehicle for the transmission of the navigation data from the motor vehicle to the isolated, immobile memory node.

The navigation system may also include a server that is spatially separated from the motor vehicle and a wireless communication connection between the server and the motor vehicle for transmitting a route communication for the motor vehicle, the navigation data and/or additional navigation data from the server to the motor vehicle. A wireless communication connection between the isolated, immobile memory node and the motor vehicle and a wireless communication connection between the server and the motor vehicle may exist offset in time.

Using the wireless communication connection between the server and the motor vehicle, the position of the motor vehicle, a desired destination for the motor vehicle and/or additional navigation data may be transmitted from the motor vehicle to the server.

In an example embodiment of the present invention, a navigation system for a motor vehicle includes one or more of the above-mentioned features, the navigation system including: a first motor vehicle; a second motor vehicle; a server separated spatially from the first and the second motor vehicle; a wireless communication connection between the server and the first motor vehicle for the transmission of a suggested route for the second motor vehicle and/or navigation data from the server to the first motor vehicle; a wireless communication connection between the first motor vehicle and the second motor vehicle for the transmission of the suggested route for the second motor vehicle and/or the navigation data from the first motor vehicle to the second motor vehicle; and a man-machine interface, arranged in the second motor vehicle, for outputting the navigation data or the suggested route to an operator of the second motor vehicle.

Using the wireless communication connection between the second motor vehicle and the first motor vehicle, the position of the second motor vehicle, a desired destination for the second motor vehicle and/or additional navigation data may be transmitted from the second motor vehicle to first motor vehicle. Using the wireless communication connection between the server and the first motor vehicle, the position of the second motor vehicle, the desired destination for the second motor vehicle and/or the additional navigation data may be transmitted from the first motor vehicle to the server. The second motor vehicle may include a position-finding system for determining the position of the second motor vehicle.

According to an example embodiment of the present invention, a navigation system for a motor vehicle includes one or more of the above-mentioned features, the navigation system including: a first motor vehicle; a second motor vehicle; a server separated spatially from the first and the second motor vehicle; a wireless communication connection between the first motor vehicle and the second motor vehicle for the transmission of the position of the second motor vehicle, a desired destination for the second motor vehicle and/or navigation data from the first motor vehicle to the second motor vehicle; and a wireless communication connection between the server and the first motor vehicle for the transmission of the position of the second motor vehicle, a desired destination for the second motor vehicle and/or navigation data from the first motor vehicle to the server.

The second motor vehicle may include a position-finding system for determining the position of the second motor vehicle.

According to an example embodiment of the present invention, a navigation system for a motor vehicle includes one or more of the above-mentioned features, the navigation system including a motor vehicle, a server that is spatially separated from the motor vehicle, a wireless communication connection between the server and the motor vehicle for the transmission of a suggested route for the motor vehicle and/or navigation data from the server to the motor vehicle and a man-machine interface arranged in the motor vehicle for outputting the navigation data or the suggested route to an operator of the motor vehicle.

Using the wireless communication connection between the server and the motor vehicle, the position of the motor vehicle, the desired destination for the motor vehicle and/or additional navigation data may be transmitted from the motor vehicle to the server.

A wireless communication connection between the server and a motor vehicle may also include a non-wireless component. A wireless communication connection between the server and a motor vehicle may include a communication connection that is wireless at least in the direction of the motor vehicle. A wireless communication connection between the server and a motor vehicle may include a wireless connection to the Internet (such as a WLAN). Wireless communication connections between the server and a motor vehicle may also include WIFI, WIMAX, RF, Mobilfunk (mobile radio communication), etc. It may be provided that, depending on certain criteria, an (automatic) selection is made between alternative wireless communication connections between the server and the first motor vehicle. These criteria may include, for example, costs, availability and/or bandwidth, etc.

The wireless communication connections described herein may be established or provided during the normal operation of the motor vehicle(s)

Example embodiments of the present invention are suitable for off-road navigation.

According to an example embodiment of the present invention, a navigation system includes: a motor vehicle; an isolated, immobile memory node adapted to store navigation data; a wireless communication connection between the isolated, immobile memory node and the motor vehicle adapted to transmit the navigation data from the isolated, immobile memory node to the motor vehicle; and a man-machine interface arranged in the motor vehicle adapted to output the navigation data to an operator of the motor vehicle.

The motor vehicle may include an on-board navigation system adapted to determine a position of the motor vehicle and to determine a suggested route, and the man-machine interface may be assigned to the onboard navigation system.

The navigation system may include: an additional motor vehicle; and a wireless communication connection between the isolated, immobile memory node and the additional motor vehicle adapted to transmit at least one of (a) the navigation data and (b) additional navigation data from the motor vehicle to the isolated, immobile memory node.

The navigation system may include: an additional motor vehicle; and a wireless communication connection between the motor vehicle and the additional motor vehicle adapted to transmit the navigation data from the motor vehicle to the additional motor vehicle.

The navigation system may include: a server spatially separate from the motor vehicle; and a wireless communication connection between the server and the motor vehicle adapted to transmit at least one of (a) a suggested route for the motor vehicle, (b) the navigation data and (c) additional navigation data from the server to the motor vehicle.

The wireless communication connection between the server and the motor vehicle may be adapted to transmit at least one of (a) a position of the motor vehicle, (b) a desired destination for the motor vehicle and (c) additional navigation data from the motor vehicle to the server.

According to an example embodiment of the present invention, a navigation system includes: a motor vehicle; an isolated, immobile memory node adapted to store navigation data; and a wireless communication connection between the isolated, immobile memory node and the motor vehicle adapted to transmit the navigation data from the from the motor vehicle to the isolated, immobile memory node. The navigation system may include: a server spatially separate from the motor vehicle; and a wireless communication connection between the server and the motor vehicle adapted to transmit at least one of (a) a position of the motor vehicle, (b) a desired destination for the motor vehicle, (c) the navigation data and (d) additional navigation information from the motor vehicle to the server.

The wireless communication connection between the server and the motor vehicle may be adapted to transmit at least one of (a) a suggested route for the motor vehicle, (b) the navigation data and (c) additional navigation information from the server to the motor vehicle.

According to an example embodiment of the present invention a navigation system includes: a first motor vehicle; a second motor vehicle; a server separated spatially from the first motor vehicle and the second motor vehicle; a wireless communication connection between the server and the first motor vehicle adapted to transmit at least one of (a) a suggested route for the second motor vehicle and (b) navigation data from the server to the first motor vehicle; a wireless communication connection between the first motor vehicle and the second motor vehicle adapted to transmit at least one of (a) the suggested route for the second motor vehicle and (b) the navigation data from the first motor vehicle to the second motor vehicle; and a man-machine interface arranged in the second motor vehicle adapted to output at least one of (a) the navigation data and (b) the suggested route to an operator of the second motor vehicle.

The wireless communication connection between the second motor vehicle and the first motor vehicle may be adapted to transmit at least one of (a) a position of the second motor vehicle, (b) a desired destination for the second motor vehicle and (c) additional navigation data from the second motor vehicle to first motor vehicle.

The wireless communication connection between the server and the first motor vehicle may be adapted to transmit at least one of (a) the position of the second motor vehicle, (b) the desired destination for the second motor vehicle and (c) additional navigation data from the first motor vehicle to the server.

The second motor vehicle may include a position-finding system adapted to determine the position of the second motor vehicle.

According to an example embodiment of the present invention, a navigation system includes: a first motor vehicle; a second motor vehicle; a server separated spatially from the first motor vehicle and the second motor vehicle; a wireless communication connection between the first motor vehicle and the second motor vehicle adapted to transmit at least one of (a) a position of the second motor vehicle, (b) a desired destination for the second motor vehicle and (c) navigation data from the second motor vehicle to the first motor vehicle; and a wireless communication connection between the server and the first motor vehicle adapted to transmit at least one of (a) the position of the second motor vehicle, (b) the desired destination for the second motor vehicle and (c) navigation data from the first motor vehicle to the server.

The second motor vehicle may include a position-finding system adapted to determine the position of the second motor vehicle.

According to an example embodiment of the present invention, a navigation system includes: a motor vehicle; a server spatially separate from the motor vehicle; a wireless communication connection between the server and the motor vehicle adapted to transmit at least one of (a) a suggested route for the motor vehicle and (b) navigation data from the server to the motor vehicle; and a man-machine interface arranged in the motor vehicle adapted to output at least one of (a) the navigation data and (b) the suggested route to an operator of the motor vehicle.

The wireless communication connection between the server and the motor vehicle may be adapted to transmit at least one of (a) the position of the motor vehicle, (b) a desired destination for the motor vehicle and (c) additional navigation data from the motor vehicle to the server.

Further aspects and details with regard to example embodiments of the present invention are described in further detail below with reference to the appended Figures.

DETAILED DESCRIPTION

Figure 1:
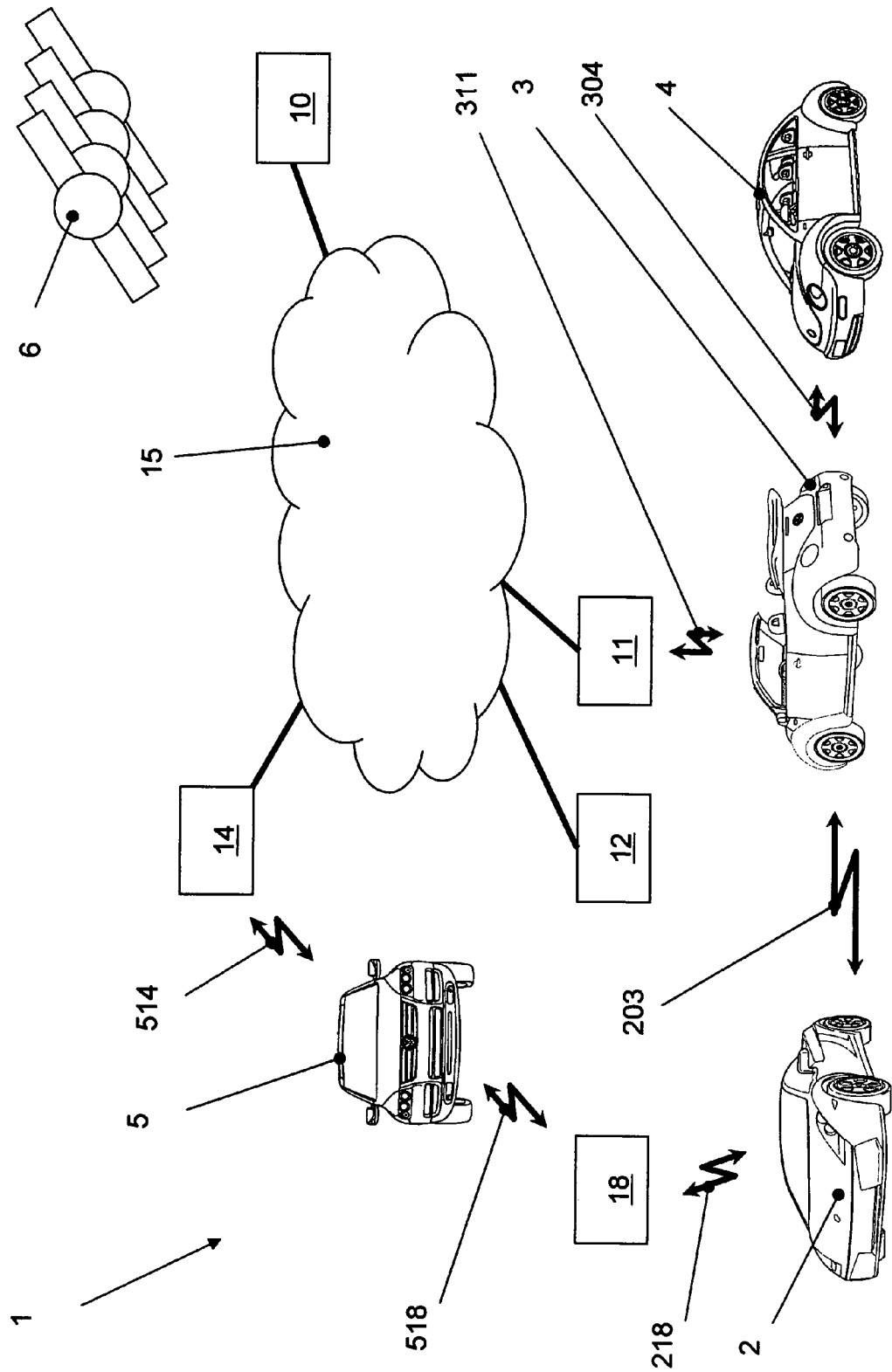
FIG. 1 schematically illustrates an exemplary embodiment of a navigation system for a motor vehicle.

FIG. 1 schematically illustrates an exemplary embodiment of a navigation system 1 for motor vehicles 2, 3, 4, 5. Navigation system 1 includes, among other things, motor vehicle 2, an isolated, immobile memory node 18 for storing at least one set of navigation data, as well as a wireless communication connection 218 between the isolated, immobile memory node 18 and motor vehicle 2 for the transmission of the navigation data from isolated, immobile memory node 18 to motor vehicle 2. Such navigation data may include, for example, a map display as well as data relating to a navigation system for the supplementary display in the map display. Such navigation data may also include a point of interest (POI) and/or additional information assigned to a point of interest (POI). Transmitted navigation data may also include or be updating data for updating navigation data that are already stored.

Isolated, immobile memory node 18 for storing navigation data may be provided, for example, at the entrance to a national park, information on camping sites and/or ranger stations in the national park being able to be transmitted to motor vehicle 2 as navigation data. However, isolated, immobile memory node 18 for storing navigation data may also be provided for the duration of a construction site or a certain construction section within the range of the construction site, information on the construction site or traffic information conditioned upon the construction site, such as a recommended detour, being able to be transmitted to motor vehicle 2 as navigation data.

It may also be provided that, using a wireless communication connection between isolated, immobile memory node 18 and a motor vehicle (such as, for example, motor vehicle 2 or motor vehicle 5, under certain circumstances) navigation data are transmitted from motor vehicle 5 to isolated, immobile memory node 18. Thus, it may also be provided that motor vehicle 5 has the right to feed navigation data into isolated, immobile memory node 18, using a wireless communication connection 518. Wireless communication connection 218 between isolated, immobile memory node 18 and motor vehicle 2 and wireless communication connection 518 between isolated, immobile memory node 18 and motor vehicle 5 may exist, in this context, offset in time.

In the exemplary embodiment illustrated in FIG. 1, motor vehicle 3 is located out of reach of isolated, immobile memory node 18, so that no direct wireless communication connection may be arranged between isolated, immobile memory node 18 and motor vehicle 3. It may also be provided that a wireless communication connection 203 between motor vehicle 2 and motor vehicle 3 is able to be arranged for the transmission of the navigation data transmitted by isolated, immobile memory node 18 to motor vehicle 2 from motor vehicle 2 to motor vehicle 3. Additional motor vehicles may also be provided as intermediate stations for the transmission of the navigation data from motor vehicle 2 to motor vehicle 3.

In the exemplary embodiment illustrated in FIG. 1, navigation system 1 also includes a server 10, that is separated spatially from motor vehicles 2, 3, 4, 5, which has access to Internet 15. Server 10 may be arranged as an offboard navigation system. It may, for example, be provided that, using server 10, a computation is able to be made of a suggested route (setpoint route to a destination and/or setpoint driving direction statement) for a motor vehicle, such as for motor vehicle 2, motor vehicle 3, motor vehicle 4 and/or motor vehicle 5. Such a suggested route may be dependent on instantaneous traffic, construction sites, weather conditions and environmental conditions and/or visibility conditions. The suggested route may also be dependent on personal preferences (interesting route, landmarks, shopping areas, etc.).

In the exemplary embodiment illustrated in FIG. 1, navigation system 1 also includes a wireless Internet connection 311 between motor vehicle 5 and server 10 and a wireless Internet connection 514 between motor vehicle 3 and server 10 for transmission of a navigation data such as a route atlas, a graphic map display as well as data regarding the navigation system, e.g., for the augmented representation in a map display, such as graphic displays and information on landmarks, traffic information and their graphic displays, and/or graphic displays and information on points of interest, to motor vehicle 3.

Traffic information may include information on traffic congestion, construction sites, information about new roads, information about no longer existing roads, information about blocked roads, and/or information about new or canceled one-way streets, etc.

To implement the communication connection between the server and motor vehicles, navigation system 1 has nodes 11, 12, 14, which allow wireless access to Internet 15. A wireless communication connection such as wireless Internet connection 311 may be arranged to motor vehicle 3, between nodes 11, 12, 14 and the motor vehicles, in this connection. Wireless communication connection 311 may be a WLAN, for example. However, it may also be provided to implement a wireless Internet connection 311 as a WIFI connection, a WIMAXI connection, an RFI connection, a mobile radio connection, etc. It may also be provided that a selection from among alternative wireless communication connections be made (automatically) as a function of certain criteria. Such criteria may include, for example, cost, availability and/or bandwidth, etc.

In the exemplary embodiment illustrated in FIG. 1, motor vehicle 4 is located outside of the range of nodes 11, 12 and 14, so that no wireless communication connection may be arranged between server 10 and motor vehicle 4. It may be provided that a wireless communication connection 304 may be arranged between motor vehicle 3 and motor vehicle 4. In this manner, for example, navigation data may be transmitted between server 10 and motor vehicle 4. In addition, in this manner, the position of motor vehicle 4 and a desired destination for motor vehicle 4 may be transmitted to server 10, and, based on these data, a suggested route may be transmitted from server 10 to motor vehicle 4. Additional motor vehicles may also be provided as intermediate stations for the transmission of navigation data, suggested routes or positions and inputs from motor vehicle 3 to motor vehicle 4 or from motor vehicle 4 to motor vehicle 3.

Figure 2:
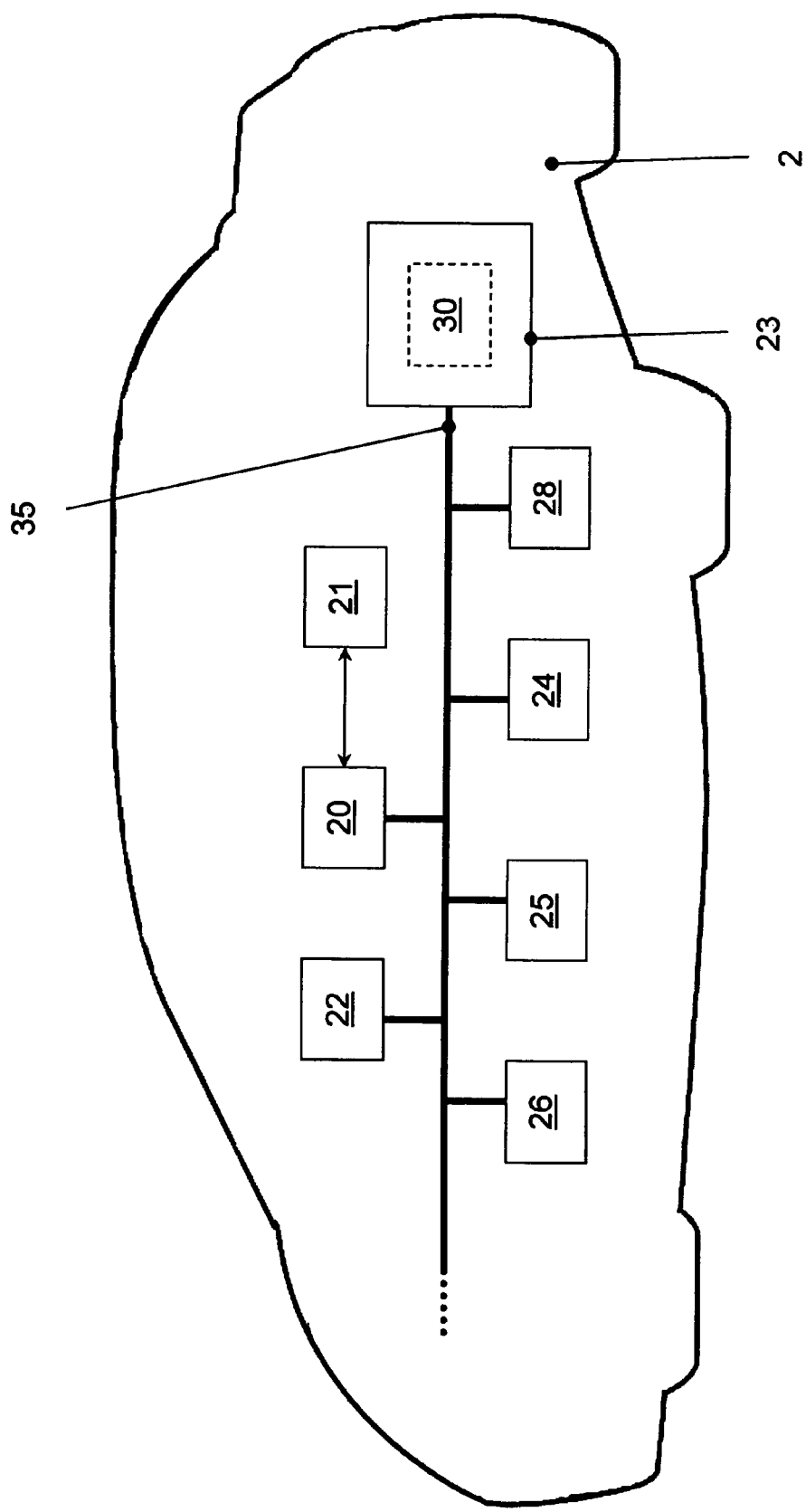
FIG. 2 schematically illustrates an exemplary embodiment of a motor vehicle having a navigation system.

FIG. 2 illustrates an exemplary embodiment of a motor vehicle 2 in a basic representation, motor vehicles 3, 4 and 5 being outfitted in analogous fashion. Motor vehicle 2 includes a man-machine interface taking the form of a touch screen 21, for outputting a suggested route, the position of motor vehicle 2 and navigation data to an operator of motor vehicle 2. For this, touch screen 21 is able to be activated using a display control 20, which is connected, using a bus system 35, to an interface device 22 (also able to be inserted as a wireless Internet interface) for wireless communication connection 218 and 203 as well as for a wireless communication connection, possible in response to appropriate positioning of motor vehicle 2, between motor vehicle 2 and server 10. Touch screen 21 may also be utilized for operating an infotainment system 24, a telephone 25, or a climate control system 26, etc.

Motor vehicle 2 includes a position-finding system 30 integrated, e.g., into an onboard navigation system 23, for determining the position of motor vehicle 2, the alignment of motor vehicle 2, and/or the onboard time as a function of signals transmitted by satellites denoted by reference numeral 6 in FIG. 1. Using onboard navigation system 23, a suggested route for motor vehicle 2 to a destination able to be input using touch screen 21 is ascertainable.

Figure 3:
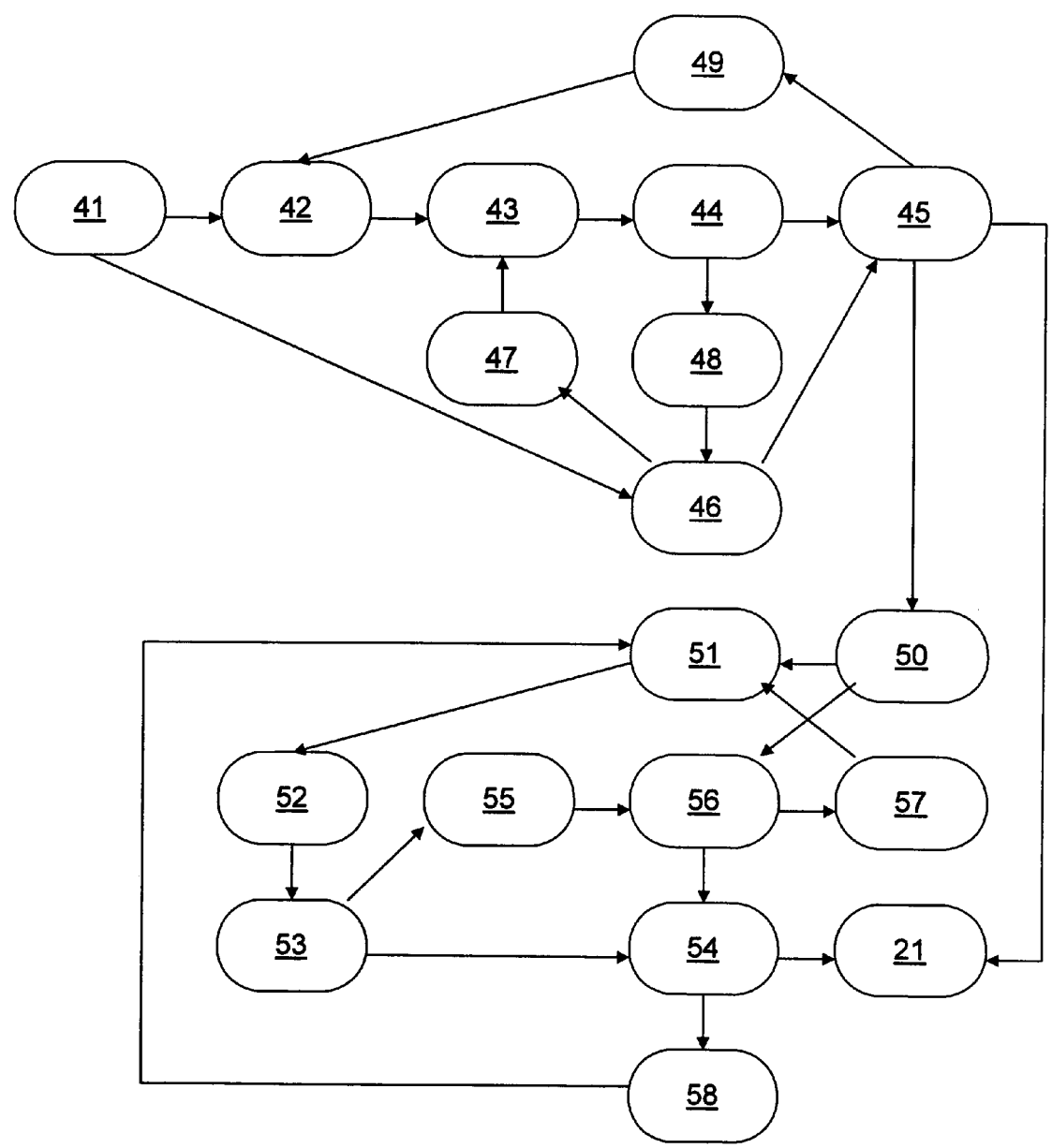
FIG. 3 illustrates a method for operating a navigation system, such as that illustrated in FIG. 1.

FIG. 3 illustrates an exemplary embodiment of a method for the operation of navigation system 1 and for supporting the navigation of motor vehicles as in the example of motor vehicle 2.

Figure 6:
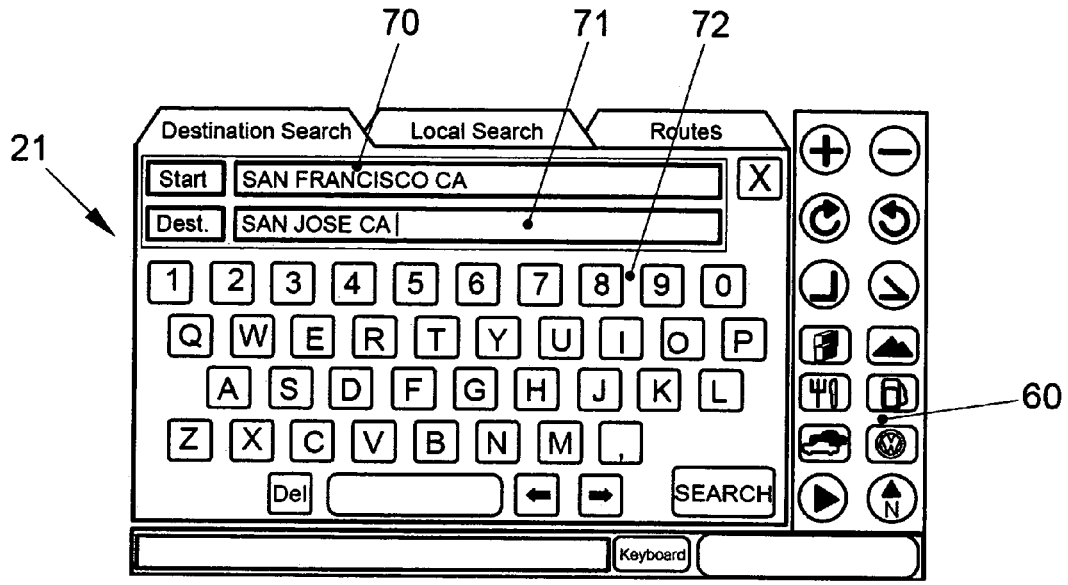
FIG. 6 illustrates an exemplary embodiment of a display of an input mask for inputting a starting point and a destination, using a touch screen.
Figure 7:
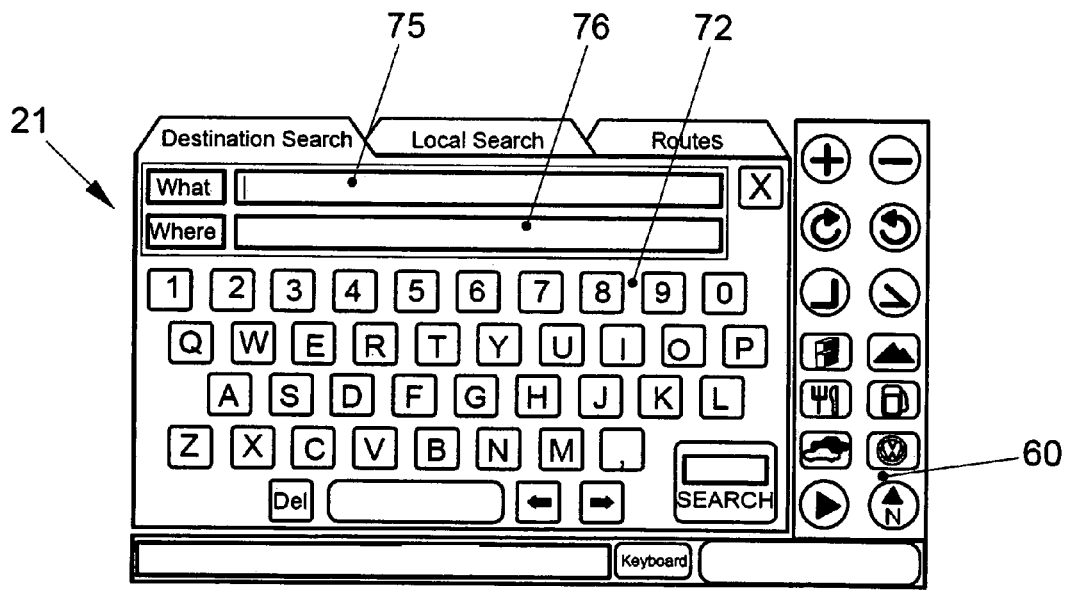
FIG. 7 illustrates an exemplary embodiment of the display of an input mask for selecting a destination, using a touch screen.

Triggered by an input of a destination, a point of interest, etc., as illustrated in exemplary fashion in FIGS. 6 and 7, a local search engine 41 looks for non-graphic navigation data (e.g., a route atlas, point of interest, etc.) in an onboard data base 42 implemented in a memory denoted by reference numeral 28 in FIG. 2.

Next, an online search engine 43, while using wireless Internet connection 203, motor vehicle 3, wireless communication connection 311 and Internet 15, searches for non-graphic navigation data in a data base 44 assigned to server 10, in which the non-graphic data are stored. In parallel, local search engine 41 searches for non-graphic navigation data in a data base 46 that is implemented in isolated, immobile memory node 18.

The result of the above-named searches is an XML data file 45 having sorted location data and GPS data and possibly other non-graphic navigation data. XML data file 45 is used by an update routine 49 for supplementing onboard data base 42 and for updating it. In the background, and possibly unnoticed by an operator, the data stored in data base 46 are used by an update routine 47 in order to supplement and update onboard data base 42. In addition, an update routine 48, also possibly working unnoticed by an operator, may optionally be provided, using which data base 46 is supplemented and updated using navigation data of data base 44.

Subsequently, a local search engine 50 searches in an onboard data base 51 for graphic navigation data, e.g., map displays. Thereafter, an online search engine 52 searches a data base 53, that is assigned to server 10, for graphic navigation data. In parallel, local search engine 51 searches for graphic navigation data in a data base 56 that is implemented in isolated, immobile memory node 18.

The result of the searches in data bases 51, 53 and 56 are selected graphic navigation data 54. Selected graphic navigation data 54 are used by an update routine 58 for supplementing onboard data base 51 and for updating it. In the background, and possibly unnoticed by an operator, the data stored in data base 56 are used by an update routine 57 in order to supplement and update onboard data base 51. In addition, an update routine 55, also possibly working unnoticed by an operator, may optionally be provided, using which, data base 56 is supplemented and updated using graphic navigation data of data base 53.

In addition, selected graphic navigation data 54 and XML data file 45 are displayed using touch screen 21 or used for displaying information, as was explained, for example, while referring to FIGS. 4, 5 and 8 to 12.

Figure 4:
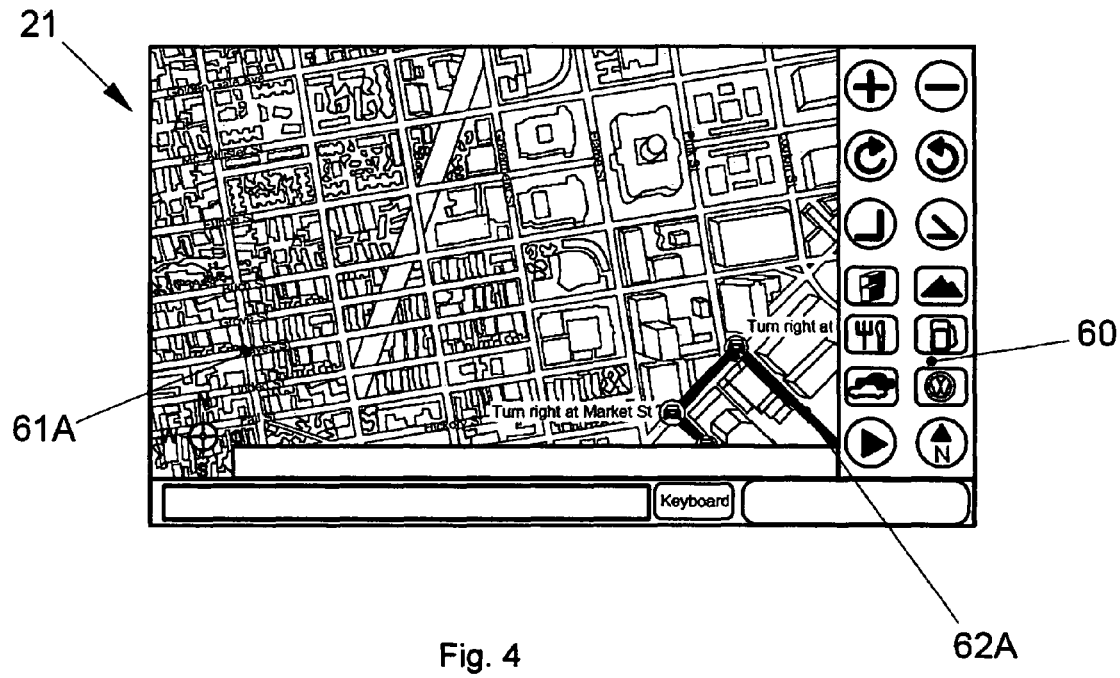
FIG. 4 illustrates an exemplary embodiment of an overhead view of a route integrated into a 3-D graphic representation, via a touch screen.
Figure 5:
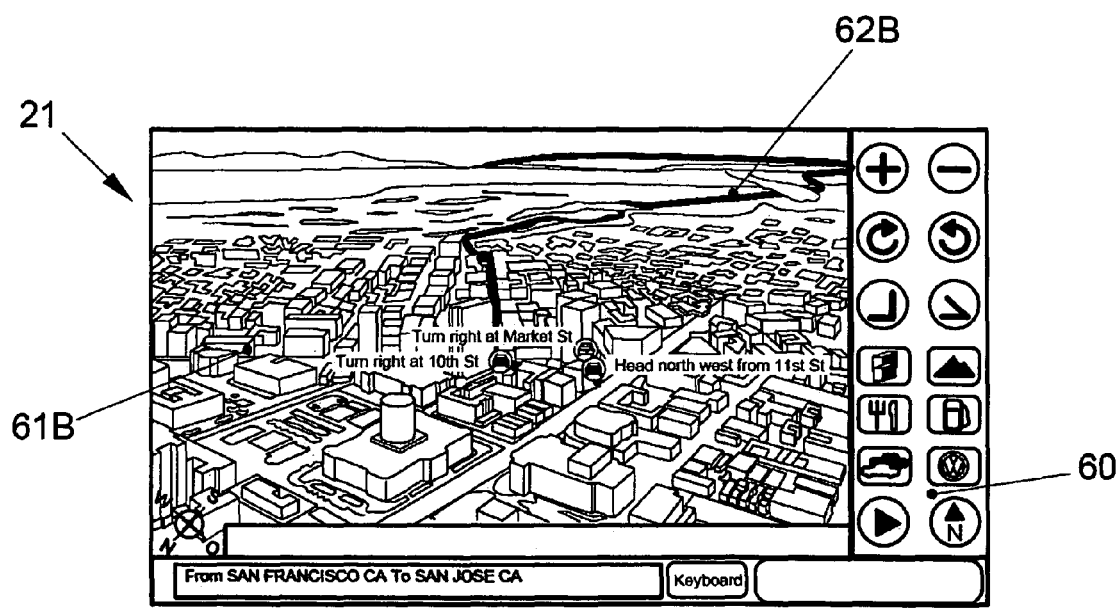
FIG. 5 illustrates an exemplary embodiment of a bird's-eye view of a route integrated into a 3-D graphic representation, via a touch screen.

FIG. 4 illustrates an exemplary embodiment of a top view illustration 61A of a suggested route 62A integrated into a 3D-graphic representation, using touch screen 21. In this view, additional information such as points of interest (POIs) may be entered as well. In addition to top view 61A of the 3D graphic representation, a tool bar 60 is displayed. With the aid of this tool bar 60, the display may be changed, and/or other and/or additional functions may be activated or controlled. For example, tool bar 60 may be used to change top view display 61A of the 3-D graphic representation, selected in FIG. 4, into a bird's-eye view 61B, as illustrated in FIG. 5. Accordingly, suggested route 62B is displayed in a form integrated into the bird's-eye view display.

FIG. 6 illustrates an exemplary embodiment of a display of an input mask for inputting a starting and destination point with the aid of touch screen 21. In the exemplary embodiment illustrated, a starting point input field 70 and a destination input field 71 are provided for this purpose. The destination input may be entered, alphanumerically, for example, using a displayed keyboard 72. Alternatively, or in addition, the destination input may also be entered via voice input or character recognition (e.g., a character recognition for identifying Asiatic characters) or a gesture input. The selection of a location may be done on a map, a satellite image and/or a 3D graphic representation. For example, a zoom function for the map, the satellite image and/or the 3D graphic representation may be provided. The starting location may also be the current position of motor vehicle 2.

As illustrated in FIG. 7, it may also be provided that an operator of motor vehicle 2 be able to search for a particular object (restaurant, landmark, store, gas station, etc.) in a particular search area (street, city, postal code, district, etc.). To this end, an input mask having an object-input field 75 for inputting an object to be searched for (restaurant, landmark, store, gas station, etc.) and an area-input field 76 for inputting the search area (street, city, postal code, district, etc.) are displayed. The operator may then select a hit from the hits ascertained with the aid of this search and available with the aid of this search (e.g., in a map, in a satellite image, and/or in a 3-D graphic representation, etc.).

It may be provided that the evaluation of a voice input or a gesture input takes place using server 10, if a connection to server 10 offboard exists. For example, voice commands may be transmitted to server 10 for evaluation, as compressed audio data files. A hybrid onboard/offboard evaluation may also be provided. For example, there first takes place an evaluation of a voice input or a gesture input onboard, and a fine evaluation of these inputs offboard, using the server.

Figure 8:
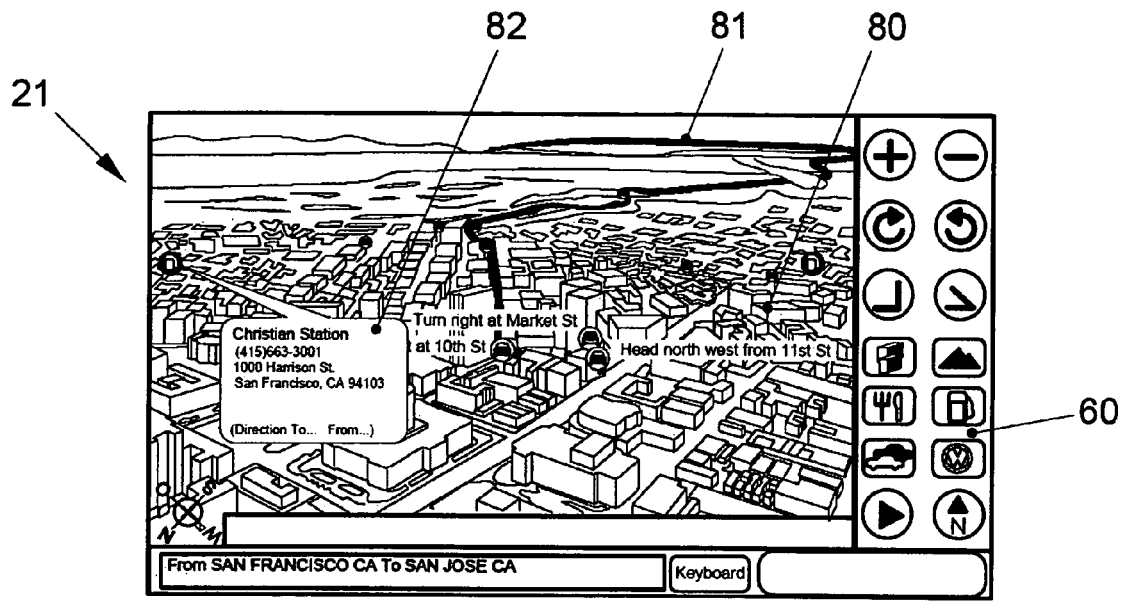
FIG. 8 illustrates an exemplary embodiment of a display for selecting preferred routes, using a touch screen.

If the destination is entered via voice input, then the voice input may be confirmed graphically 82, as illustrated in FIG. 8. As illustrated in FIG. 8, this graphic confirmation 82 may, for example, overlap a map display for a limited period of time. Thus, the exemplary embodiment illustrated in FIG. 8 illustrates, for example, a bird's-eye view 80 of a suggested route 81 integrated into a 3-D graphic representation, using touch screen 21.

Figure 9:
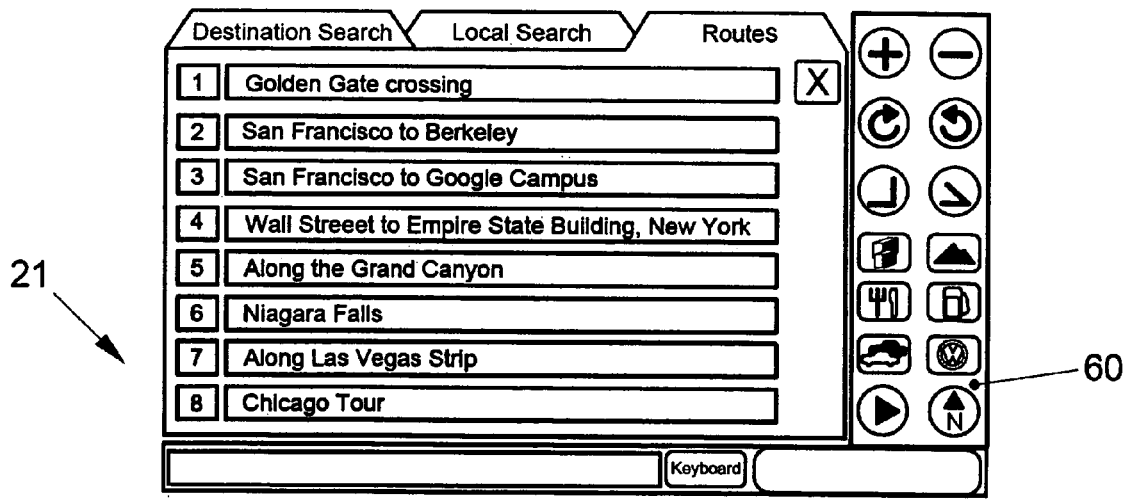
FIG. 9 illustrates an exemplary embodiment of a display of an overall view of a route, using a touch screen.

It may also be provided that preferred routes are selectable. FIG. 9, for example, illustrates an exemplary embodiment of a display for selecting preferred routes using touch screen 21.

An automatic destination selection or at least an interactively automatic destination selection may also be provided under certain conditions. Thus, it may be provided that motor vehicle 3 transmits operating data of motor vehicle 3 to server 10. In this regard, an operational information item of the motor vehicle may include, for example, the status of the fuel tank level, the oil level, information regarding a defect, etc. If, for example, information that the tank is almost empty is transmitted, then navigation to the nearest gas station is offered and/or provided. If, for example, information that a specific defect is present is transmitted, then navigation to the nearest (suitable) service station is offered and/or provided.

Figure 10:
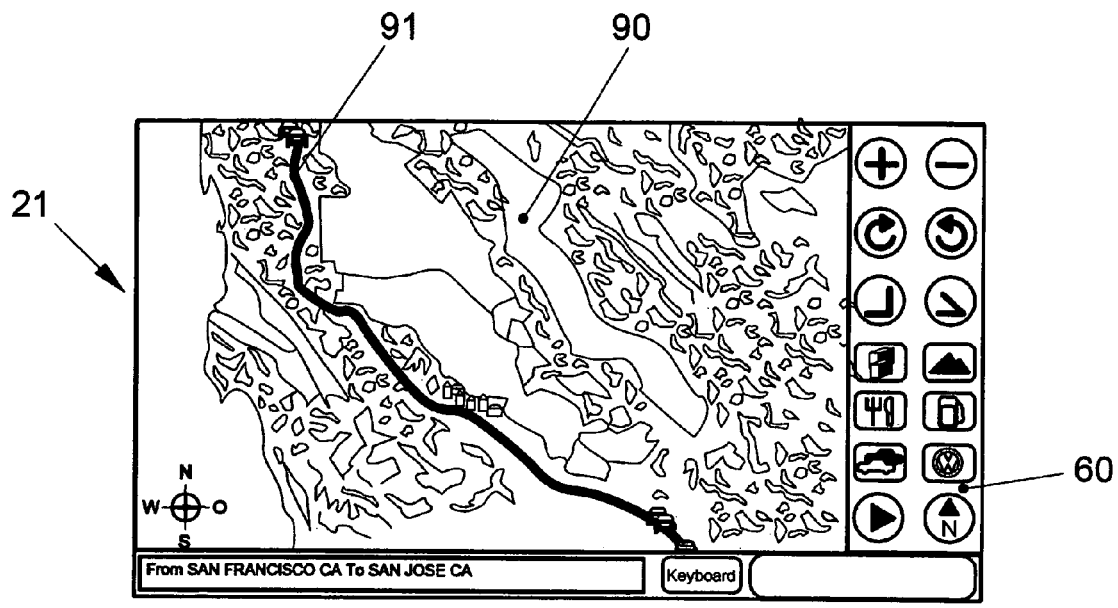
FIG. 10 illustrates an exemplary embodiment of a display for operating a voice input, using a touch screen.

FIG. 10 illustrates an exemplary embodiment of a display of a route overview by touch screen 21. Reference numeral 90 denotes a satellite image, and reference numeral 91 denotes a suggested route. The overall view of the route may also be implemented in a fly-through mode, e.g., from a bird's-eye view.

Figure 11:
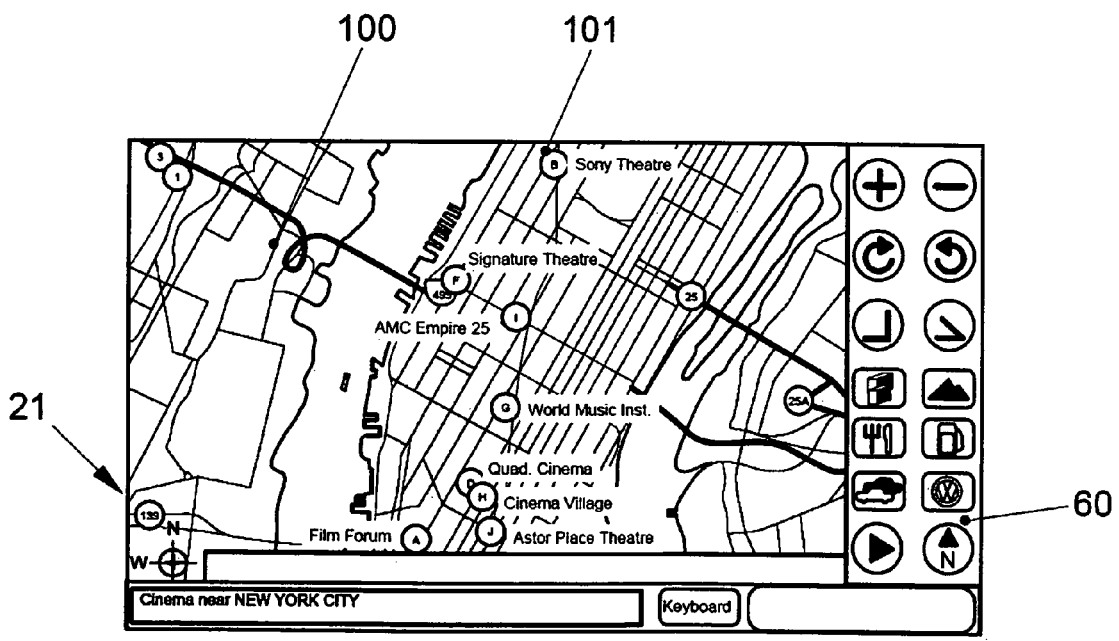
FIG. 11 illustrates an exemplary embodiment of a display of a satellite image supplemented by data, using a touch screen.

As illustrated in FIG. 11, satellite images 100 may also be superposed by, or supplemented with additional information 101, such as streets, street names or designations, buildings, vehicles, traffic information, POIs (optionally customized), call-out boxes, service areas, etc. Special references to rest areas or parking areas may be provided, for example, when a specific driving time has been exceeded.

Figure 12:
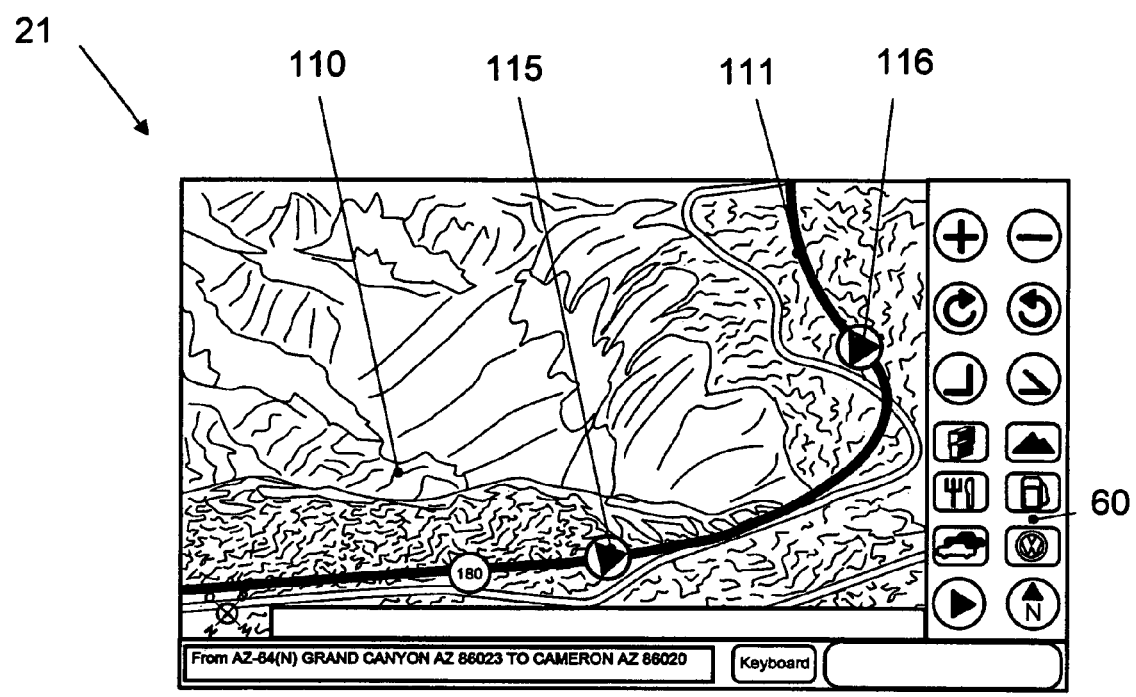
FIG. 12 illustrates an exemplary embodiment of a cutout from a display of a suggested route, together with a follow-me function.

As illustrated in FIG. 12, a follow-me function may also be provided in which position 116 of another selected motor vehicle is displayed on a map, a satellite image, and/or a 3-D graphical representation 110, e.g., together with position 115 of motor vehicle 2. In addition, a suggested route 111 may be displayed.

It may be provided that a motor vehicle such as motor vehicle 2 includes more than one man-machine interface, such as touch screen 21 for the output or display of suggested routes, positions of motor vehicles and navigation data. Thus, it may be provided that a man-machine interface, assigned to a driver, displays different data than another man-machine interface, or that the man-machine interface assigned to a driver shows the same data as another man-machine interface, but in a different manner.

LIST OF REFERENCE NUMERALS

| | |
|---|---|
| 1 | navigation system |
| 2, 2, 4, 5 | motor vehicle |
| 6 | satellite |
| 10 | server |
| 11, 12, 14 | node |
| 15 | Internet |
| 18 | isolated, immobile memory node |
| 20 | display control unit |
| 21 | touch screen |
| 22 | interface system |
| 23 | on-board navigation system |
| 24 | infotainment system |
| 25 | telephone |
| 26 | climate control system |
| 28 | memory |
| 30 | position-finding system |
| 35 | bus system |
| 41, 50 | local search engine |
| 42 | onboard database for non-graphic navigation data |
| 43, 52 | online search engine |
| 44 | database for non-graphic navigation data, assigned to a server |
| 45 | XML data file |
| 46 | database for non-graphic navigation data implemented in an isolated, immobile memory node |
| 47, 48, 49, 55, 57, 58 | update routine |
| 51 | onboard database for non-graphic navigation data |
| 53 | database, assigned to a server, for graphic navigation data |
| 54 | selected graphic navigation data |
| 56 | database for graphic navigation data implemented in an isolated, immobile memory node |
| 60 | tool bar |
| 61A | top view display |
| 61B, 80 | bird's-eye view |
| 62A, 62B, 81, 91, 111 | suggested route |
| 70 | starting-point input field |
| 71 | destination input field |
| 72 | keyboard |
| 75 | object input field |
| 76 | area input field |
| 82 | graphic confirmation |
| 90, 100 | satellite image |
| 101 | additional information |
| 110 | 3D-graphic illustration |
| 115 | position of a motor vehicle |
| 116 | position of a selected other motor vehicle |
| 203, 218, 304, 518 | wireless communication connection |
| 311, 514 | wireless Internet connection |

What is claimed is:

1. A navigation system, comprising:

a motor vehicle;

an isolated, immobile memory node adapted to store navigation data and not directly connected to a network;

a temporary wireless communication connection between the isolated, immobile memory node and the motor vehicle adapted to transmit the navigation data from the isolated, immobile memory node to the motor vehicle; and a man-machine interface arranged in the motor vehicle adapted to output the navigation data to an operator of the motor vehicle.

2. The navigation system according to claim 1, wherein the motor vehicle includes an on-board navigation system adapted to determine a position of the motor vehicle and to determine a suggested route, the man-machine interface assigned to the onboard navigation system.

3. The navigation system according to claim 1, further comprising:
an additional motor vehicle; and
a temporary wireless communication connection between the isolated, immobile memory node and the additional motor vehicle adapted to transmit at least one of (a) the navigation data and (b) additional navigation data from the motor vehicle to the isolated, immobile memory node.

4. The navigation system according to claim 1, further comprising:
an additional motor vehicle; and
a wireless communication connection between the motor vehicle and the additional motor vehicle adapted to transmit the navigation data from the motor vehicle to the additional motor vehicle.

5. The navigation system according to claim 1, further comprising:
a server spatially separate from the motor vehicle; and
a wireless communication connection between the server and the motor vehicle adapted to transmit at least one of (a) a suggested route for the motor vehicle, (b) the navigation data and (c) additional navigation data from the server to the motor vehicle.

6. The navigation system according to claim 5, wherein the wireless communication connection between the server and the motor vehicle is adapted to transmit at least one of (a) a position of the motor vehicle, (b) a desired destination for the motor vehicle and (c) additional navigation data from the motor vehicle to the server.

7. A navigation system, comprising:
a motor vehicle;
an isolated, immobile memory node adapted to store navigation data and not directly connected to a network; and
a temporary wireless communication connection between the isolated, immobile memory node and the motor vehicle adapted to transmit the navigation data from the motor vehicle to the isolated, immobile memory node.

8. The navigation system according to claim 7, further comprising:
a server spatially separate from the motor vehicle; and
a wireless communication connection between the server and the motor vehicle adapted to transmit at least one of (a) a position of the motor vehicle, (b) a desired destination for the motor vehicle, (c) the navigation data and (d) additional navigation information from the motor vehicle to the server.

9. The navigation system according to claim 8, wherein the wireless communication connection between the server and the motor vehicle is adapted to transmit at least one of (a) a suggested route for the motor vehicle, (b) the navigation data and (c) additional navigation information from the server to the motor vehicle.

10. The navigation system according to claim 7, further comprising:
a first motor vehicle;
a second motor vehicle;
a server separated spatially from the first motor vehicle and the second motor vehicle;
a wireless communication connection between the server and the first motor vehicle adapted to transmit at least one of (a) a suggested route for the second motor vehicle and (b) navigation data from the server to the first motor vehicle;
a wireless communication connection between the first motor vehicle and the second motor vehicle adapted to transmit at least one of (a) the suggested route for the second motor vehicle and (b) the navigation data from the first motor vehicle to the second motor vehicle; and
a man-machine interface arranged in the second motor vehicle adapted to output at least one of (a) the navigation data and (b) the suggested route to an operator of the second motor vehicle.

11. The navigation system according to claim 10, wherein the wireless communication connection between the second motor vehicle and the first motor vehicle is adapted to transmit at least one of (a) a position of the second motor vehicle, (b) a desired destination for the second motor vehicle and (c) additional navigation data from the second motor vehicle to first motor vehicle.

12. The navigation system according to claim 11, wherein the wireless communication connection between the server and the first motor vehicle is adapted to transmit at least one of (a) the position of the second motor vehicle, (b) the desired destination for the second motor vehicle and (c) additional navigation data from the first motor vehicle to the server.

13. The navigation system according to claim 10, wherein the second motor vehicle includes a position-finding system adapted to determine the position of the second motor vehicle.

14. A navigation system, comprising:
a first motor vehicle;
a second motor vehicle;
a server separated spatially from the first motor vehicle and the second motor vehicle;
a wireless communication connection between the first motor vehicle and the second motor vehicle adapted to transmit at least one of (a) a desired destination for the second motor vehicle and (b) navigation data from the second motor vehicle to the first motor vehicle; and
a wireless communication connection between the server and the first motor vehicle adapted to transmit at least one of (a) the desired destination for the second motor vehicle and (b) navigation data from the first motor vehicle to the server.

15. The navigation system according to claim 14, wherein the second motor vehicle includes a position-finding system adapted to determine the position of the second motor vehicle.

16. A navigation system, comprising:
a motor vehicle;
an isolated, immobile memory node adapted to store navigation data and not directly connected to a network;
a temporary wireless communication connection between the isolated, immobile memory node and the motor vehicle adapted to transmit the navigation data from the motor vehicle to the isolated, immobile memory node;
a server spatially separate from the motor vehicle;
a wireless communication connection between the server and the motor vehicle adapted to transmit at least one of (a) a suggested route for the motor vehicle, (b) the navigation data and (c) additional navigation information from the server to the motor vehicle; and
a man-machine interface arranged in the motor vehicle adapted to output at least one of (a) the navigation data and (b) the suggested route to an operator of the motor vehicle.

17. The navigation system according to claim 16, wherein the wireless communication connection between the server and the motor vehicle is adapted to transmit at least one of (a) the position of the motor vehicle, (b) a desired destination for the motor vehicle, (c) the navigation data and (d) additional navigation information from the motor vehicle to the server.

18. The navigation system according to claim 3, wherein the temporary wireless communication connection between the isolated, immobile memory node and the motor vehicle and the temporary wireless communication connection between the isolated, immobile memory node and the additional motor vehicle exist offset in time.

19. The navigation system according to claim 5, wherein the temporary wireless communication connection between the isolated, immobile memory node and the motor vehicle and the wireless communication connection between the server and the motor vehicle exist offset in time.

20. The navigation system according to claim 8, wherein the temporary wireless communication connection between the isolated, immobile memory node and the motor vehicle and the wireless communication connection between the server and the motor vehicle exist offset in time.

* * * * *